2,977,322
Patented Mar. 28, 1961

2,977,322

DEACTIVATION OF METALLIC POISONS ON USED CRACKING CATALYSTS

Charles W. Varvel and Dean P. Montgomery, Bartlesville, Okla., assignors to Phillips Petroleum Company, a corporation of Delaware No Drawing. Filed July 25, 1957, Ser. No. 674,046

10 Claims. (Cl. 252—411)

This invention relates to a process for improving the cracking characteristics of a cracking catalyst contaminated with deactivating poisons deposited thereon during the cracking of hydrocarbon material.

It is well known in the art that catalyst poisons such as nickel and vanadium are introduced to the cracking reactor in hydrocarbon oils charged and especially in the heavy gas oils and crude oils when these are used. These poisons increase the production of hydrogen, dry gas and coke, obviously this effect decreasing the amount of charge that can be converted to gasoline. The worst effect in most cases, however, is the increased coke production, for most cracking units are limited in charge rate by regenerator capacity. Thus, it can be seen that deactivation of these poisons is highly desirable.

Accordingly, an object of the invention is to provide a process for deactivating metal-containing poisons accumulated on used cracking catalysts. Another object is to provide a treated catalyst which has lower hydrogen and coke-producing characteristics than the untreated catalysts. Other objects of the invention will become apparent from a consideration of the accompanying disclosure.

This invention is concerned with the deactivation of metallic poisons accumulated on used cracking catalysts. The process comprises contacting the regenerated catalyst with combined phosphorus and with chlorine, preferably in combined form. The treated catalyst is hydrated with steam at elevated temperature following treatment and before use in cracking. It is most convenient and simple to treat the catalyst at operating temperature with a phosphorus chloride or oxychloride. However, the treatment can quite satisfactorily be carried out with the phosphorus and chlorine in separate compounds, which may be organic though inorganic compounds are usually preferred.

From the standpoint of convenience and simplicity, it is desirable to treat the catalyst at operating temperature and to use a single treating agent which is liquid at ordinary temperatures and gaseous at elevated temperature. Compounds such as phosphorus trichloride and phosphorus oxychloride ($POCl_3$) are in this class. Phosphorus pentachloride may be used with equally satisfactory results, but is normally solid, and is not as readily handled. (At elevated temperatures, phosphorus pentachloride appears to dissociate to chlorine and the trichloride, so this treatment is substantially equivalent to treating with these materials.)

The treating method use will vary in details with the particular type of cracking process being used. In a fixed bed unit, the treatment may be effected by passing vapors of the treating agent over the catalyst and then passing steam over the catalyst. In a fluid bed unit, the treatment may be carried out by adding the treating agent to the catalyst in the transfer line carrying regenerated catalyst to the reactor and subsequently adding steam to the stream to hydrate the catalyst. In a second method, a side stream of the regenerated catalyst can be withdrawn from the regenerator or transfer line, this stream treated continuously or batchwise by the method of this invention, and the treated catalyst introduced to the transfer line or reactor for use in the cracking reaction. Other specific methods of operation can be readily devised and will to some extent depend on the exact apparatus in which the cracking reaction is carried out.

The deactivation of the catalyst poisons is just as effectively, but not quite as conveniently, effected by using one compound as a source of phosphorus and another as a source of chlorine. For example, phosphorus can be introduced by addition of phosphorus trioxide or pentoxide, an acid of phosphorus, phosphine, an ester of an acid of phosphorus, and numerous others. The chlorine can be introduced as hydrogen chloride; chlorinated hydrocarbon such as carbon tetrachloride, methyl chloride, chloroform, mono- or dichloroethane and similar compounds; or elemental chlorine itself. The exact manner of effecting the treatment depends on the particular sources of phosphorus and whether the cracking unit is a fluid, fixed, or moving bed type. The treating compounds may be introduced either simultaneously or in sequence.

The treating temperature is not critical, although treating at operating temperatures such as about 850° F. to about 1150° F. are quite satisfactory. Lower temperature treatment, even impregnation at ordinary temperature, is satisfactory, although obviously the treated catalyst is heated to operating temperature by the time it is used in the reactor.

The amount of treating agent used is quite small, 0.05 weight percent of $POCl_3$ having been found to give excellent results. As little as 0.001 weight percent of treating agent gives useful results. Greater amounts than 0.05 weight percent can be used, but little additional benefit is obtained except perhaps in cases of extremely large amounts of catalyst poisons.

As will be apparent from the specific examples appearing below, this method gives unexpectedly great deactivation of the catalyst poisons and the effect is quite long lasting. It is to be pointed out that hydration of the catalyst with steam is necessary in order to get the full benefit of the treatment, and this hydration should take place following the treatment.

EXAMPLE I

A Borger wide range gas oil was cracked in a laboratory fluid cracking unit at 900° F., 10 p.s.i.g. and a charge rate of 1.5 g. oil/g. catalyst/hour with the equivalent of 15 pounds of process steam added for each bbl. of oil charged. The unit contained 1000 grams of catalyst and was operated on a 12.75 minute cracking cycle. All data are adjusted to 50 percent conversion.

The catalyst used was a silica-alumina catalyst made by acid activation of a natural clay withdrawn from the plant regenerator and had 0.35 weight percent carbon on it. The catalyst was contaminated with 2255 p.p.m. of vanadium oxide and nickel oxide. The completely regenerated samples had been freed of carbon by oxidative regeneration in the laboratory unit, and the tests with plant regenerated catalyst were conducted with catalyst having no further oxidative regeneration after removal from the plant regenerator.

Table I
RESULTS OF TESTS

| Catalyst | Treatment | $H_2$, ft.³/bbl. | Dry Gas ($C_2$ and Lighter), ft.³/bbl. | Gasoline, Vol. Percent | Carbon, Wt. Percent |
|---|---|---|---|---|---|
| Completely regenerated | none | 335 | 432 | 35.1 | 6.4 |
| Do | $POCl_3$, 4 g | 106 | 194 | 36.9 | 4.4 |
| Do | $PCl_3$, 4 g | 73 | 151 | 38.0 | 3.4 |
| Plant regenerated | none | 325 | 424 | 34.8 | 5.6 |
| Do | $POCl_3$, 0.5 g | 202 | 300 | 37.2 | 4.3 |
| Do | $POCl_3$, 4 g | 227 | 330 | 37.3 | 4.3 |

These data show the effectiveness of the treatment of this invention, and also that only small amounts of treating agent are necessary.

EXAMPLE II

A 1000-gram portion of the Borger equilibrium catalyst, completely freed of carbon, was treated with 3.7 grams of orthophosphoric acid diluted to 100 ml. of aqueous acid. The catalyst was placed in the reactor and treated with 4.4 grams of anhydrous HCl and followed by hydration with steam. Results of a test under conditions described in Example I are shown below, along with comparative data using untreated catalyst.

Table II
TEST RESULTS

| | $H_2$, cu. ft./bbl. | Dry Gas, Cu. ft./bbl. | Gasoline, Vol. Percent of Feed | Carbon, Wt. Percent of Feed |
|---|---|---|---|---|
| Untreated Catalyst | 335 | 432 | 35.1 | 6.4 |
| Treated Catalyst | 118 | 198 | 37.2 | 4.2 |

These data show that the benefits of the treatment are obtainable by treatment with a phosphorus compound and a chlorine compound in sequence, and the benefits of the treatment are obtainable without treatment of the catalyst simultaneously with the phosphorus and chlorine or with a single compound containing both phosphorus and chlorine.

EXAMPLE III

A sample of the completely regenerated catalyst as used in the earlier tests was treated by impregnation with aqueous phosphoric acid to give an equivalent amount of phosphorus in the final catalyst. The catalyst was dried, placed in the reactor and tested under the same conditions as used in the previous tests. The catalyst was hydrated at 900° F. in the apparatus prior to use. The results, adjusted to 50 percent conversion, follow:

Table III

Hydrogen production_____cu. ft./bbl__ 303
Dry gas production_____do____ 397
Gasoline, volume percent_____ 34.2
Carbon, weight percent_____ 6.25

These data show the relatively poor result obtained in the absence of chlorine in the treatment.

EXAMPLE IV

The following tests were carried out using samples of the same batch of equilibrium catalyst used in the previous tests. The data below were obtained at the same process conditions as the previous tests, the data tabulated being at 50 percent conversion.

The catalyst samples used were catalyst treated with 2.6 g. HCl for 1000 g. of catalyst, and catalyst treated with 3.23 g. $POCl_3$ for 1000 g. of catalyst.

Table IV

| | 1st Cycle | 4th Cycle | 10th Cycle | 11th Cycle |
|---|---|---|---|---|
| HCl Treated: | | | | |
| $H_2$, cu. ft./bbl. | 189 | 204 | 240 | |
| Dry Gas, ft./bbl. | 280 | 293 | 333 | |
| Gasoline, Vol. Percent Feed | 36.2 | 36.2 | 35.3 | |
| Carbon, Wt. Percent Feed | 4.90 | 4.96 | 5.45 | |
| $POCl_3$: | | | | |
| $H_2$, ft.³/bbl | 104 | 107 | | 130 |
| Dry Gas, ft./bbl. | 187 | 192 | | 215 |
| Gasoline, Vol. Percent Feed | 37.5 | 37.7 | | 38.4 |
| Carbon, Wt. Percent Feed | 4.35 | 4.25 | | 4.30 |

Data for untreated catalyst are shown in previous examples.

EXAMPLE V

Tests were made with the plant regenerated natural catalyst of Example I treated with $POCl_3$ with and without subsequent steam treatment. The run conditions were the same as those of Example I. The data obtained are summarized below calculated at 50% conversion.

Table V

| Run No. | Catalyst Treatment | | $H_2$, ft.³/bbl. | Dry Gas, ft.³/bbl. | Gasoline, Vol. Percent | Carbon, Wt. Percent |
|---|---|---|---|---|---|---|
| | Steam | Agent | | | | |
| 1 | @ 900° F | none | 325 | 424 | 34.8 | 5.6 |
| 2 | @ 900° F | $POCl_3$, 1.32 g. @ 900° F. | 203 | 300 | 36.8 | 4.57 |
| 3 | @ 900° F | $POCl_3$, 1.0 g. @ 1,100° F. | 160 | 238 | 37.7 | 4.05 |
| 4 | @ 1,100° F | $POCl_3$, 1.0 g. @ 1,100° F. | 132 | 215 | 37.0 | 3.5 |
| 5 | none | 1.2 c. $POCl_3$ @ 900° F. | 280 | 370 | 36.4 | 5.0 |

Comparison of Run No. 5 with Run No. 2 shows that steam treating the catalyst after treatment with POCl₃ effects improvement of the catalyst. A comparison of Run No. 4 with Run No. 3 indicates that the method is more effective where the steam treatment is carried out at 1100° than at 900° F. The data also show that treatment of the catalyst with the treating agent (POCl₃) without subsequent steam treatment produces improved results over untreated plant regenerated catalyst.

EXAMPLE VI

The data in this example were obtained under the cracking conditions of Example I and are calculated at 50 percent conversion. The tests or runs of the previous examples utilized a 40-60 blend of Filtrol natural (silica-alumina) catalyst and SR (sulfur resistant) silica-alumina both of which are natural clay catalysts in origin. The runs of this example were made on a synthetic-SR blend containing 45 and 55 percent, respectively. This particular catalyst contained 1928 parts per million of nickel and vanadium oxides and the catalyst was completely regenerated.

*Table VI*

| Run No. | Catalyst Treatment | | H₂, ft.³/bbl. | Dry Gas, ft.³/bbl. | Gasoline, Vol. Percent | Carbon, Wt. Percent |
| --- | --- | --- | --- | --- | --- | --- |
| | Steam | Agent | | | | |
| 1 | none | none | 283 | 388 | 33.6 | 5.45 |
| 2 | none | 1 g. POCl₃ @ 900° F. | 107 | 203 | 33.3 | 5.0 |

The data in Table VI show that the treatment of the completely regenerated catalyst containing a substantial amount of synthetic silica-alumina with a phosphorus compound and with chlorine (POCl₃) effects an improvement in the catalyst in lower production of hydrogen and dry gas.

Certain modifications of the invention will become apparent to those skilled in the art and the illustrative details disclosed are not to be construed as imposing unnecessary limitations on the invention.

We claim:

1. A process for improving the activity and lowering the coke-forming characteristics of a used silica-containing hydrocarbon cracking catalyst contaminated with poisons comprising nickel and vanadium which comprises impregnating said catalyst at a temperature in the range of atmospheric to 1150° F. with a compound containing phosphorus and with chlorine so as to deposit therein phosphorus and chlorine in amounts of at least 0.001 weight percent of the catalyst and sufficient to deactivate said poisons and thereafter subjecting the treated catalyst to hydration in a steam ambient at a temperature in the range of about 900° F. to about 1100° F.

2. The process of claim 1 wherein said phosphorus compound also contains chlorine.

3. The process of claim 1 wherein the chlorine is separate from the phosphorus compound.

4. The process of claim 1 wherein said catalyst is impregnated with phosphorus trichloride.

5. The process of claim 1 wherein said catalyst is impregnated with phosphorus oxychloride.

6. A process for improving the activity and lowering the coke-forming characteristics of a used silica-alumina hydrocarbon cracking catalyst contaminated with poisons comprising nickel and vanadium which comprises regenerating said catalyst by impregnating same at a temperature in the range of 850 to 1050° F. with a compound containing phosphorus and with chlorine so as to deposit in said catalyst amounts of phosphorus and chlorine of at least 0.001 and up to 0.05 weight percent of said catalyst and sufficient to deactivate said poisons, and thereafter hydrating the treated catalyst with steam at a temperature in the range of about 900 to 1100° F.

7. The process of claim 6 wherein said phosphorus compound also contains chlorine.

8. The process of claim 6 wherein the chlorine is separate from the phosphorus compound.

9. The process of claim 6 wherein said catalyst is impregnated with phosphorus trichloride.

10. The process of claim 6 wherein said catalyst is impregnated with phosphorus oxychloride.

References Cited in the file of this patent

UNITED STATES PATENTS

| | | |
| --- | --- | --- |
| 2,584,102 | Mavity | Feb. 5, 1952 |
| 2,668,798 | Plank | Feb. 9, 1954 |
| 2,758,097 | Doherty et al. | Aug. 7, 1956 |